United States Patent

Winkler et al.

[15] 3,704,941

[45] Dec. 5, 1972

[54] MOTION PICTURE PROJECTOR

[72] Inventors: Alfred Winkler, Munich; Johann Zanner, Unterhaching; Bernhard V. Fischern; Klaus Füchsle, both of Munich, all of Germany

[73] Assignee: AGFA-Gevaert Aktiengesellschaft, Leverkusen, Germany

[22] Filed: Dec. 17, 1970

[21] Appl. No.: 99,179

[30] Foreign Application Priority Data

Dec. 20, 1969 Germany...................P 19 64 011.0

[52] U.S. Cl.............................352/92, 179/100.2 S
[51] Int. Cl............................................G03b 21/50
[58] Field of Search...................352/92; 179/100.2 S

[56] References Cited

UNITED STATES PATENTS

| | | | |
|---|---|---|---|
| 1,944,024 | 1/1934 | Foster et al. | 352/92 |
| 3,573,392 | 4/1971 | Trammell | 179/100.2 S |

Primary Examiner—Samuel S. Matthews
Assistant Examiner—Russell E. Adams, Jr.
Attorney—Michael S. Striker

[57] ABSTRACT

A motion picture projector for use with film wherein the light transmissivity of the leading and trailing film portions is less than the light transmissivity of the median or main film portion. The film is scanned by one or more photoelectric receivers which produce signals in response to detection of the main film portion while the film is moved forwardly whereby such signals cause the film transporting mechanism to reduce the speed of forward transport of the film to normal speed. The receiver or receivers can also produce signals in response to detection of the trailing film portion whereby such signals initiate automatic reversal in the direction of film transport so that the film is collected by the supply reel. The signals which are produced in response to detection of the main film portion can also cause the claw pull-down to begin with stepwise transport of film past the gate, a shutter to permit entry of light into the projection lens system, a film threading mechanism to move away from the supply reel, a pressure plate to move against the film, and/or a deflecting mechanism for the tip of the leading film portion to assume an inoperative position. Signals which are produced in response to detection of the trailing portion of the film can further cause a shutter to move between the lens system and the light source, to automatically arrest the rewinding drive with a desired delay, and/or to open the circuit of the light source.

29 Claims, 6 Drawing Figures

MOTION PICTURE PROJECTOR

BACKGROUND OF THE INVENTION

The present invention relates to cinematographic apparatus in general, and more particularly to improvements in motion picture projectors, especially those utilizing cassettes for convoluted motion picture film. Still more particularly, the invention relates to improvements in projectors for use with motion picture film wherein the light transmissivity of the leading and/or trailing film portion differs from the light transmissivity of the main or median portion of film.

It is already known to provide a motion picture projector with a film transporting mechanism which is operated at a higher rate of speed while it threads the leading portion of the film from the supply reel to the takeup reel. This is desirable in order to reduce the length of the intervals which elapse between the projections of images on successive reels of motion picture film. The ideal situation is that when the speed of film transport is reduced at the exact moment when the foremost film frame is in registry with the optical system of the motion picture projector. In heretofore known projectors, such timing of the speed reduction is possible only if the leading portions of successive rolls of motion picture film have identical lengths, a condition which is hard to fulfill especially if the foremost exposed frames happen to be unsatisfactory (overexposed or underexposed). Certain presently known projectors are provided with variable-speed drives for motion picture film which start to reduce the speed of film transport in response to automatic attachment of the leading portion of film to the core of the takeup reel. As mentioned above, such systems are satisfactory if the leading portion of each of a series of successive rolls of motion picture film is of a predetermined length, namely, such length that, when the tip of the leading portion of the film is automatically attached to the core of the takeup reel, the foremost frame of the main film portion is in exact registry with the optical system of the projector. In order to take into account different lengths of leading portions of discrete rolls of motion picture film, the just mentioned projectors are designed to reduce the speed of the film transporting mechanism after an interval of time which is needed to transport at a high speed a leading portion of minimum length. This means that, when the length of a leading portion exceeds such minimum length, the remaining part of the leading portion is transported at the lower or normal speed so that it takes much time before the foremost satisfactory frame of the film reaches the optical system.

SUMMARY OF THE INVENTION

An object of the invention is to provide a novel and improved projector for use with motion picture film wherein at least one characteristic of the leading and/or trailing film portion differs from the corresponding characteristic of the main film portion, namely, of that portion which includes film frames whose images are to be projected onto a screen or the like, and to rely on such characteristics for regulating the operation of one or more adjustable projector units, for example, of one or more mechanisms which transport the film between a supply reel and a takeup reel.

Another object of the invention is to provide a motion picture projector wherein the speed of forward transport of the film is automatically changed in response to placing of the foremost film frame (preferably the foremost satisfactory film frame) into registry with the optical system of the projector.

A further object of the invention is to provide a motion picture projector wherein the rewinding of film onto the supply reel begins in automatic response to completion of the projection of image of the last satisfactory film frame so that the length of intervals between presentations of successive rolls of motion picture film can be reduced to a minimum.

An additional object of the invention is to provide a cinematographic apparatus wherein two or more operations which are characteristic of satisfactory functioning of a modern motion picture projector are either terminated, started or altered in response to placing of the foremost or rearmost satisfactory film frame into registry with the optical system.

Still another object of the invention is to provide a motion picture projector wherein the film is transported at the normal speed only at such times when the film portion with satisfactory frames moves past the projection lens system.

Another object of the invention is to provide a motion picture projector wherein the rapid transport of film from the supply reel toward the takeup reel is terminated in response to completion of transport of the leading portion past the lens system independently of the length of the leading portion and which is particularly suited for use with motion picture film which is stored in cassettes or like containers for convoluted film.

The invention is embodied in a cinematographic apparatus for use with motion picture film having a first or leading portion, a second or trailing portion and a main portion whose light transmissivity differs from the light transmissivity of at least one of the first and second portions. The apparatus comprises scanning means preferably including one or more photoelectric receivers for scanning the film and for producing signals which are indicative of light transmissivity of the scanned portions, a plurality of adjustable units (including, for example, transporting means for moving the film past the scanning means, shutter means which extends across the path of light passing from a light source to the lens system, a claw pull-down which transports the film stepwise past the gate, a film threading mechanism which can transport the leading portion of motion picture film from a supply reel toward the core of a takeup reel, a rewinding mechanism which can rapidly rewind the film onto the supply reel, and/or a device which deflects the tip of the leading portion of convoluted motion picture film away from the next-to-the-outermost convolution), and adjusting means for adjusting at least one such unit in response to signals from the scanning means.

For example, the scanning means can serve to track the leading and main portions of the film and to cause the adjusting means to reduce the speed of film transport when the leading portion moves beyond the projection gate. Also, the scanning means can serve to initiate rapid rewinding of motion picture film in response to detection that the last frame of the main film portion has passed beyond the projection gate. The scanning means can also serve to reduce the speed of film transport in response to completed transport of the leading portion past the gate as well as to cause rapid rewinding of film when the last frame of the main film portion has passed the gate. In this way, the length of intervals between presentations of successive films can be reduced to a minimum, especially if the rolls of film are stored in cassettes which are placed into requisite position for presentation in a predetermined sequence by an automatic transporting mechanism.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
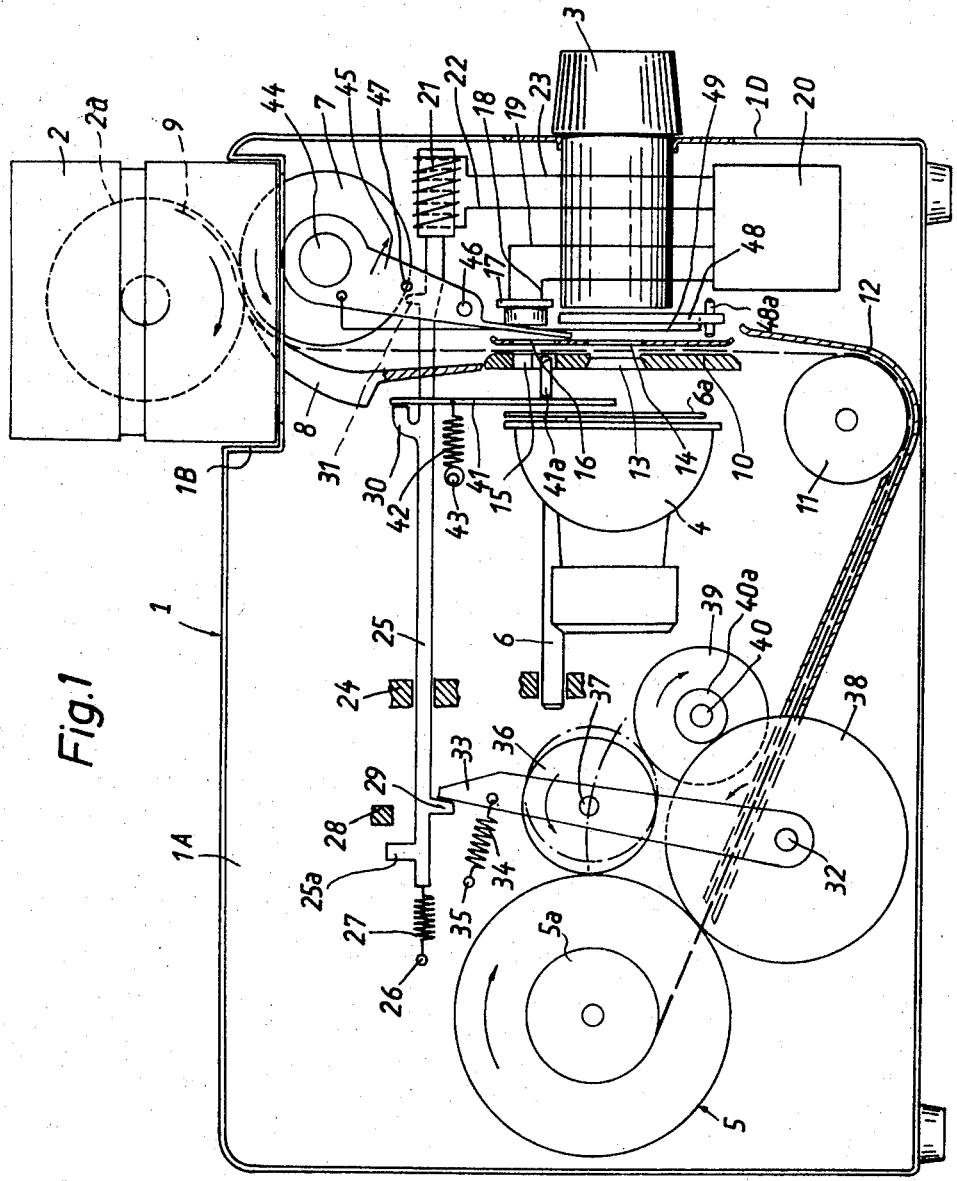
FIG. 1 is a diagrammatic longitudinal vertical sectional view of a motion picture projector which embodies one form of the invention.
Figure 2:
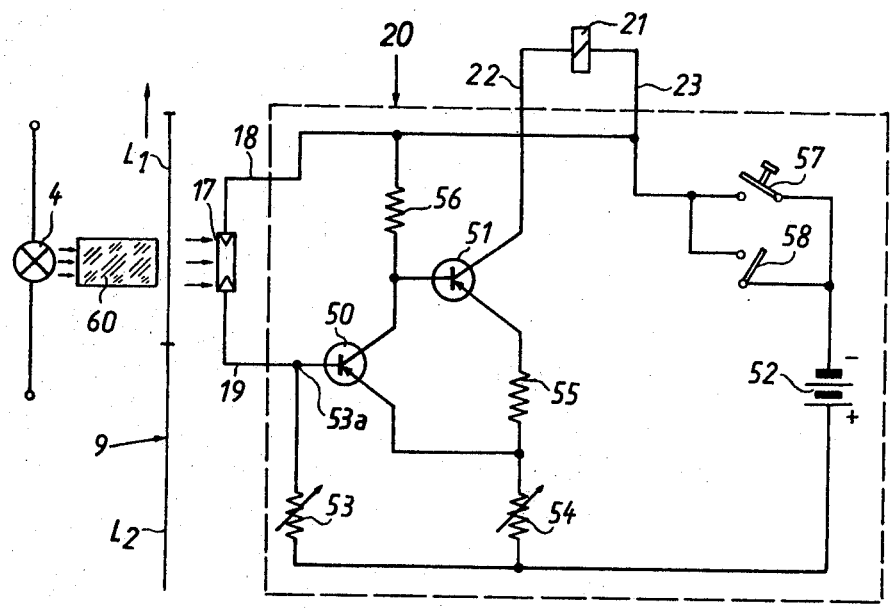
FIG. 2 illustrates the details of an electric control circuit which forms part of the adjusting means in the projector of FIG. 1.

Referring first to FIGS. 1 and 2, there is shown a motion picture projector for use with cassettes or containers 2 for convoluted motion picture film 9 of the type having at least one row of perforations (not shown), a leading portion $L_1$, a main portion $L_2$, and a trailing portion (not shown). The projector comprises a housing 1 having a top wall 1A provided with a recess 1B for reception of a single cassette 2 or a magazine or tray containing a stack of cassettes 2. The front wall 1D of the housing 1 supports a mount 3 for a projection lens system and the interior of the housing accommodates a light source 4 (preferably including an electric lamp located in front of a suitable reflector) which can direct a beam of light through the lens system in the mount 3. The housing 1 further accommodates or supports a takeup reel 5 having a core 5a provided with customary means for automatically engaging and retaining the foremost end of the leading portion $L_1$. Still further, the housing 1 accommodates a diaphragm 6a rotatable by a shaft 6 which receives motion from the motor (not shown) of the motion picture projector.

The cassette 2 contains a supply reel 2a for convoluted motion picture film 9 and the bottom part of the cassette has an opening (not shown) for introduction of a motor-driven auxiliary film or threading mechanism or unit 7 which can transport the leading portion $L_1$ along a predetermined path toward engagement with the core 5a of the takeup reel 5. The opening in the bottom part of a properly inserted cassette 2 further permits entry of a deflecting mechanism or unit 8 which serves to deflect the tip of the leading portion $L_1$ from the next-to-the-outermost convolution of film 9 in the cassette 2 and to direct the thus deflected tip into the aforementioned path. Such path extends in front of a gate 10 which is installed between the lens mount 3 and light source 4 and is provided with a window 13 for the passage of light into and through the lens system in the mount 3. Once the tip of the leading portion $L_1$ advances beyond the gate 10, it is caused to pass around a guide roller 11 and to enter a channel 12 which directs the tip of the leading portion toward the core 5a of the takeup reel 5.

A pressure plate or unit 14 is located in front of the gate 10 and can be moved rearwardly toward the gate when the threading of the leading portion $L_1$ is completed and when the foremost frame of the main film portion $L_2$ is in registry with or is about to register with the window 13. The gate 10 has an aperture 15 which is loaded upstream or ahead of the window 13 (as considered in the direction of film transport toward the takeup reel 5) and registers with an aperture 16 in the pressure plate 14. The apertures 15, 16 serve to transmit a certain amount of light from the source 4 against the photosensitive surface of a photoelectric receiver here shown as a resistor 17 which is connected with the input of a control circuit 20 by means of conductors 18, 19. The resistor 17 constitutes a scanning device which scans successive increments of the film 9 and transmits to the input of the control circuit 20 signals which are indicative of the light transmissivity of scanned increments. It is assumed that the leading portion $L_1$ transmits less light than the main portion $L_2$ of the film 9. The output of the control circuit 20 is connected with the winding of an electromagnet 21 by means of conductors 22, 23. The electromagnet 21 serves to adjust one or more adjustable units of the projector in response to signals produced by the photoelectric resistor 17. Such units include the threading mechanism 7, the deflecting mechanism 8, the pressure plate 14, a pull-down 41, a masking device 48 and a main film transporting mechanism (including a driven friction wheel 36) which can drive the takeup reel 5 at several speeds. The main film transporting mechanism thus constitutes a variable-speed drive for the reel 5.

The armature of the electromagnet 21 can shift an elongated adjusting bar 25 which is reciprocable in bearings 24 provided in the housing 1 and is biased in a direction to to the right, as viewed in FIG. 1, by a helical compression spring 27 reacting against a retainer post 26 in the housing 1. When the electromagnet 21 is deenergized, the spring 27 is free to expand and to urge a projection or tooth 25a of the bar 25 against a fixed stop 28 in the housing 1. The bar 25 is further provided with three motion transmitting projections 29, 30 and 31. The leftmost projection 29 can pivot a speed changer lever 33 connected to one end of a helical spring 34 the other end of which is connected to a stationary post 35. The spring 34 tends to pivot the speed changer lever 33 in a counterclockwise direction so as to maintain the upper end of the lever in engagement with the projection 29 irrespective of the axial position of the bar 25. The speed changer lever 33 carries a driven shaft 37 for a friction wheel 36 which engages the flange or flanges of the takeup reel 5 when the electromagnet 21 is energized, i.e., when the tooth 25a is remote from the stop 28. When the electromagnet 21 is deenergized so that the spring 27 is free to move the tooth 25a against the stop 28, the friction wheel 36 engages a second friction wheel 39 on a shaft 40 which carries a smaller friction wheel 40a. The latter can rotate a large friction wheel 38 which is in permanent engagement with the flange or flanges of the takeup reel 5. The friction wheel 38 is rotatable on a shaft 32 which defines a pivot axis for the speed changer lever 33. The shaft 37 is driven by the motor of the motion picture projector in a manner not forming part of the present invention. It will be seen that the takeup reel 5 is rotated at a higher speed when the electromagnet 21 is energized because the takeup reel is then rotated in a clockwise direction directly by the friction wheel 36. When the electromagnet 21 is deenergized, the takeup reel 5 is indirectly rotated by the friction wheel 36 at a lower speed through the intermediary of the friction wheels 39, 40a and 38. Other types of variable-speed drives for rotating the takeup reel 5 at several speeds can be used with equal advantage. All that counts is to construct the variable-speed drive or main film transporting means in such a way that the takeup reel 5 is rotated at a higher speed when the photoelectric resistor 17 scans the leading portion $L_1$ (i.e., when the electromagnet 21 is energized) and that the takeup reel 5 is rotated at a lower speed when the resistor 17 scans the main portion $L_2$ of the film 9. The just discussed variable-speed drive includes the parts 33–40a.

The motion transmitting projection 30 of the bar 25 and adjust the claw pull-down 41 which constitutes a film feeding device. The pull-down 41 is biased against the projection 30 by a helical spring 42 which is attached to a stationary post 43 in the housing 1. The claw 41a of the pull-down 41 can enter the perforations (not shown) of the film 9 when the takeup reel 5 is rotated at the lower speed (normal operation of the projector). The film 9 is then transported past the gate 10 in stepwise fashion to place successive frames of the main portion $L_2$ into registry with the window 13.

The film threading mechanism 7 is mounted on a shaft 44 which is mounted on one arm of a two-armed lever 45. The latter is turnable on a pivot pin 46 which is mounted in the housing 1. The other arm of the lever 45 can move the pressure plate 14 against the gate 10 when the motion transmitting projection 31 of the bar 25 engages a pin 47 on the upper arm of the lever 45. Such pivoting of the lever 45 in a clockwise direction, as viewed in FIG. 1, takes place when the electromagnet 21 is deenergized so that the takeup reel 5 begins to rotate at the lower speed. The film threading mechanism 7 is then disengaged from the outermost convolution of film 9 on the supply reel 2a of the cassette 2. The lever 45 is coupled to the aforementioned opaque shutter or masking device 48 by way of an intermediate lever 49. When the lower arm of the lever 45 moves the pressure plate 14 toward the gate 10, the intermediate lever 49 withdraws the shutter 48 from the path for projection light so that such light can pass through the lens system in the mount 3 to illuminate a screen or the like, not shown. The shutter 48 is pivotable on a fixed pin 48a of the housing 1. This shutter extends across the path of light when the takeup reel 5 is rotated at the higher speed, i.e., during threading of the leading portion $L_1$ through the projector and during its attachment to the core 5a of the takeup reel 5.

The parts 20, 21, 25 together constitute adjusting means which can adjust the unit 7, 8, 14, 33–40a, 41 and/or 48 in response to signals from the scanning resistor 17.

The details of the control circuit 20 are shown in FIG. 2. This circuit includes a switching stage comprising two transistors 50 and 51, an energy source 52, and a variable resistor 53 which is in series with the photoelectric resistor 17 and energy source 52. The base of the transistor 50 is connected to a tap 53a between the resistors 17, 53 and the emitter of the transistor 50 is connected with the positive pole of the energy source 52 by way of a variable resistor 54. The emitter of the transistor 50 is further connected to the emitter of the transistor 51 by way of a fixed resistor 55. The collector of the transistor 51 is connected to the electromagnet 21 by the aforementioned conductor 22, and the base of the transistor 51 is connectable with the negative pole of the energy source 52 by way of a fixed resistor 56. Furthermore, the base of the transistor 51 is connected with the collector of the transistor 50. The control circuit 20 can be completed in response to closing of a master switch 57 and/or in response to closing of an auxiliary switch 58 which closes in response to energization of the electromagnet 21. The switches 57, 58 are connected in parallel and the negative pole of the energy source 52 is connected with the winding of the electromagnet 21 by way of the conductor 23 in response to closing of at least one of the switches 57, 58. The conductor 19 connects the photoelectric resistor 17 with the base of the transistor 50 and the conductor 18 connects the resistor 17 with the negative pole of the energy source 52 in response to closing of the switch 57 and/or 58. The numeral 60 denotes a light conducting bar which can be used as a substitute for the apertures 15, 16 of FIG. 1 and serves to direct a certain amount of light from the source 4 to the resistor 17.

The operation:

When the user inserts a fresh cassette 2 into the recess 1B of the top wall 1A, the leading portion $L_1$ of film 9 which is convoluted on the supply reel 2a of such cassette must be threaded through the projector housing 1 along a predetermined path to advance from the opening in the bottom part of the cassette 2, between the gate 10 and pressure plate 14, around the guide roller 11, through the channel 12 and on to the core 5a of the takeup reel 5. As stated before, the light transmissivity of the main film portion $L_2$ exceeds the light transmissivity of the leading portion $L_1$ so that the photoelectric resistor 17 offers a greater resistance to the flow of current when it is exposed to light which has passed from the source 4, through the apertures 15, 16 or light conducting element 60, and on to the photosensitive surface of the resistor 17. Since the light transmissivity of the main film portion $L_2$ fluctuates from frame to frame, the resistance of the resistor 17 will also fluctuate when the frames of the main film portion $L_2$ are caused to advance past the apertures 15, 16 or past the light conducting element 60.

The resistance of the photoelectric resistor 17 is selected in such a way that the control circuit 20 maintains the electromagnet 21 in energized condition when the resistor 17 receives light which passes through the leading portion $L_1$. The energized electromagnet 21 then maintains the bar 25 in the position shown in FIG. 1 in which the bar 25 stresses the spring 27 and its projection 29 enables the spring 34 to maintain the friction wheel 36 in direct frictional engagement with the flange or flanges of the takeup reel 5. Thus, the leading portion $L_1$ is rapidly transported toward and its tip is automatically attached to the core 5a.

When the foremost frame of the main portion $L_2$ of the film 9 moves into registry with the apertures 16, 17 or with the light conducting element 60, the average resistance of the resistor 17 decreases so that the control circuit 20 causes a deenergization of the electromagnet 21 with the result that the spring 27 expands and moves the tooth 25a of the bar 25 against the stop 28. The projection 29 thereby pivots the speed changer lever 33 in a clockwise direction to move the friction wheel 36 from engagement with the flange or flanges of the takeup reel 5 into engagement with the friction wheel 39 which rotates the takeup reel 5 at a reduced speed through the intermediary of the shaft 40 and friction wheels 40a, 38. Of course, the control circuit 20 can energize the electromagnet 21 only in response to closing of the master switch 57 which can be closed by hand. While the leading portion $L_1$ moves past the apertures 15, 16 or past the light conducting element 60, the resistance of the resistor 17 exceeds a predetermined value and the base of the transistor 50 is positive so that the transistor 50 blocks. The base of the transistor 51 is negative so that the transistor 51 conducts and energizes the electromagnet 21. As stated before, energization of the electromagnet 21 causes the variable-speed drive including the lever 33 and friction wheels 36, 38, 39, 40a to rotate the takeup reel 5 at a higher speed. The energized electromagnet 21 also closes the auxiliary switch 58 so that the operator can release the master switch 57.

When the foremost frame (or the foremost satisfactory frame) of the main film portion $L_2$ reaches the apertures 15, 16 or the light conducting element 60, the resistance of the resistor 17 decreases sufficiently to shift the potential at the base of the transistor 50 in the negative direction so that the transistor 50 begins to conduct and the transistor 51 blocks to deenergize the electromagnet 21. The spring 27 thereupon reduces the rotational speed of the takeup reel 5 in the aforedescribed manner by causing the driven friction wheel 36 to rotate the takeup reel by way of the friction wheels 39, 40a and 38. The auxiliary switch 58 opens in response to deenergization of the electromagnet 21 so that the control circuit 20 is open. However, the circuit of the motor in the projector housing remains completed and the friction wheels 36, 39, 40a, 38 continue to drive the takeup reel 5 at the lower speed. The circuit 20 and the electromagnet 21 consume little energy because the electromagnet is energized only during the short period of rapid transport of the leader past the resistor 17.

The variable-speed drive 33-40a for the takeup reel 5 is but one of several adjustable units which can be adjusted in response to detection of the foremost film frame on the main film portion $L_2$ by the scanning resistor 17. When the spring 27 is free to expand in response to deenergization of the electromagnet 21, the projection 31 of the bar 25 strikes against the pin 47 of the lever 45 which moves the film threading mechanism 7 away from engagement with the outermost convolution of film 9 on the supply reel 2a and the deflecting mechanism 8 is retracted to an inoperative position, for example, through the intermediary of the lever 45. At the same time, the lower arm of the lever 45 moves the pressure plate 14 to its operative position (toward the gate 10), and the lever 45 also causes the intermediate lever 49 to pivot the shutter 48 on the pin 48a so that the shutter permits the light beam issuing from the source 4 to pass through the window 13, through the foremost frame of the main film portion $L_2$, and through the lens system in the mount 3 to project the image of the foremost frame onto a screen, not shown. It is clear that the delay with which the variable-speed drive 33-40a begins to rotate the takeup reel 5 at the lower speed, with which the projection 30 adjusts the claw pull-down 41, and with which the projection 31 performs the above-enumerated functions following a deenergization of the electromagnet 21 is selected in such a way that the foremost frame of the main film portion $L_2$ registers with the window 13 and with the lens system in the mount 3 when the shutter 48 is moved to its retracted position. Such delay is selected with a view to account for the speed of film transport and for the inertia of movable parts.

When the projection 30 of the bar 25 moves the pull-down 41 to the position shown in FIG. 1, the claw 41a of the pull-down is free to periodically enter the perforations of the main film portion $L_2$ and to transport such main film portion stepwise to place successive film frames into registry with the window 13 at a rate which is synchronized with the lower speed of the takeup reel 5.

An important advantage of the adjusting means including the control circuit 20 and electromagnet 21 is that the leading portion $L_1$ can be threaded through the projector and advanced beyond the gate 10 at a high speed so that the foremost frame of the main film portion $L_2$ is placed into registry with the window 13 with a minimum of delay. The operation of the adjusting means is not necessarily dependent on the length of the leader $L_1$, i.e., the adjusting means simply responds to detection of that part of the film whose light transmissivity is sufficiently low to cause a deenergization of the electromagnet 21 to there initiate a reduction in rotational speed of the takeup reel 5.

It is further clear that the adjusting means of FIGS. 1 and 2 can be modified so as to reverse the motor of the motion picture projector when the photoelectric resistor 17 detects the trailing portion of the film 9. The light transmissivity of such trailing portion is normally less than the light transmissivity of the main film portion $L_2$. The arrangement can be such that the motor of the film threading mechanism 7 is rotated at a high speed as soon as the resistor 17 detects the trailing portion of the film 9 to insure that the film is rewound onto the supply reel 2a with a minimum of delay. If desired, the projector can be equipped with a second adjusting means which is analogous to the adjusting means 20, 21, 25 and serves to initiate rapid rewinding of film onto the supply reel 2a as soon as the resistor 17 or a second resistor detects the trailing portion of the film 9.

Another important advantage of the structure shown in FIGS. 1 and 2 is that the resistor 17 can spot unsatisfactory frames at the forward end of the main film portion $L_2$ and continues to transmit to the circuit 20 signals which result in energization of the electromagnet 21 so that the unsatisfactory (overly dark) frames are transported at the higher speed and the speed of the takeup reel 5 is reduced only when the resistor 17 spots the foremost satisfactory film frame. Thus, the projection of images can begin only when the first satisfactory film frame reaches the window 13 in the gate 10.

Figure 3:
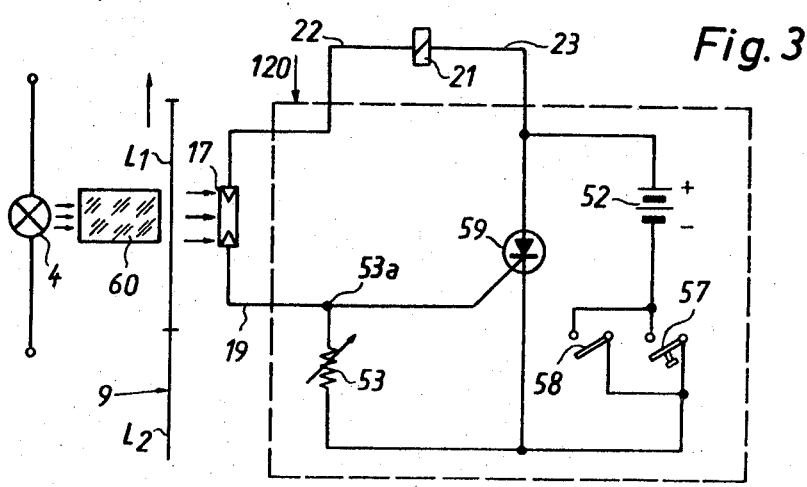
FIG. 3 is a diagram of a modified control circuit which can be used in the projector of FIG. 1.

FIG. 3 illustrates a modified control circuit 120 which can be used in place of the control circuit 20 shown in FIG. 2. The control circuit 120 comprises a semiconductor element here shown as a thyristor 59 which replaces the parts 50, 51, 55 and 56 in the control circuit 20. The control electrode of the thyristor 59 is connected to a tap 53a between the photoelectric resistor 17 and the variable resistor 53, and one contact electrode of the thyristor 59 is connected with the winding of the electromagnet 21. The conductor 18 is omitted because the conductor 22 connects the winding of the electromagnet 21 with one terminal of the photoelectric resistor 17.

The mode of operation of the projector shown in FIG. 1 is not changed in any major respect if the control circuit 20 of FIG. 2 is replaced with the control circuit 120 of FIG. 3. As long as the light beam issuing from the source 4 and passing through the light-conducting element 60 of FIG. 3 (or through the apertures 15, 16 of FIG. 1) passes through the leading portion $L_1$ whose transmissivity is lower than that of the main portion $L_2$ of the film 9, the resistance of the resistor 17 is so high that the potential at the control electrode of the thyristor 59 is a negative potential. The thyristor 59 then energizes the electromagnet 21 which maintains the bar 25 in the position shown in FIG. 1. When the foremost satisfactory frame of the main film portion $L_2$ moves into register with the photoelectric resistor 17, the potential at the control electrode of the thyristor 59 is shifted in a positive direction so that the thyristor blocks and deenergizes the electromagnet 21. The deenergized electromagnet 21 opens the auxiliary switch 58.

Figure 4:
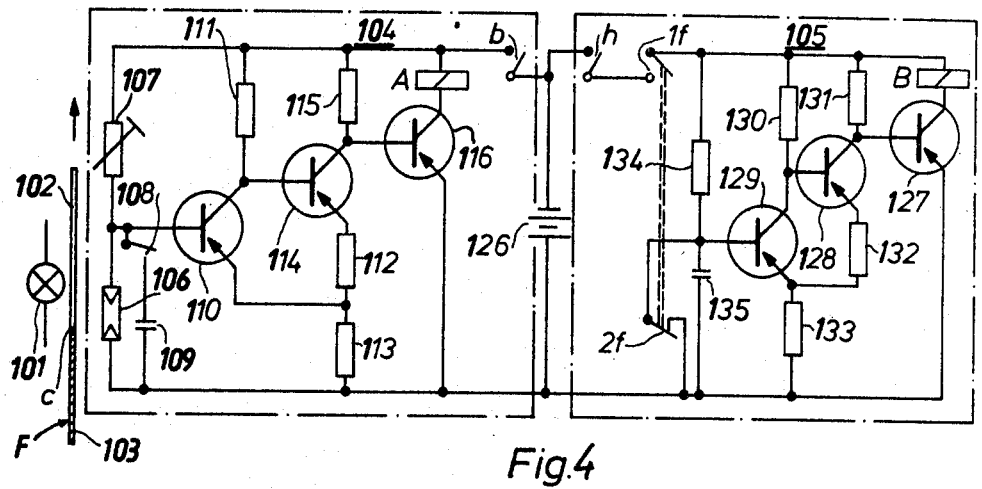
FIG. 4 is a diagram of the circuitry in a modified motion picture projector.
Figure 6:
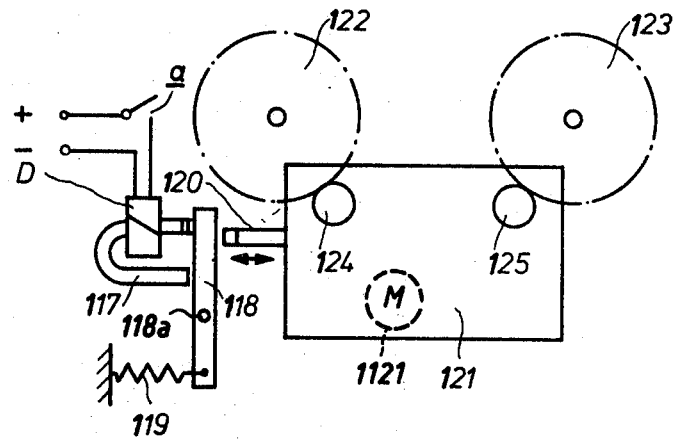
FIG. 6 illustrates certain details of the projector which employs the circuitry of FIG. 4.

FIG. 4 illustrates a portion of third adjusting means which can be utilized in a motion picture projector further embodying the structure shown in FIG. 6. The reference character 101 denotes a light source (preferably the light source which emits light in a direction toward the lens system) which can direct a beam of light against a photosensitive receiver 106 through the main portion 102 or through the trailing portion 103 of motion picture film F. The circuitry shown in FIG. 4 includes a control circuit 104 whose input is connected with the photoelectric resistor 106, and a delay circuit 105. The light transmissivity of the trailing portion 103 is less than the light transmissivity of the main portion 102 of the film F.

The photoelectric resistor 106 is in series with a variable resistor 107 of the control circuit 104 and in parallel with a capacitor 109 which can be placed in circuit with the resistor 106 in response to closing of a switch 108. The tap between the resistors 106, 107 is connected with the base of a first transistor 110 whose collector circuit includes a fixed resistor 111. The emitter of the transistor 110 is connected with a junction between the resistors 112, 113 of a voltage divider. This voltage divider is in the emitter circuit of a second transistor 114. The collector circuit of the transistor 114 includes a resistor 115 and is connected with the base of a third transistor 116. The collector circuit of the transistor 116 includes an electromagnet A which controls a switch a (see FIG. 6) in the circuit of a second electromagnet D. The electromagnet D has a permanent magnet core 117. A lever 118 which is pivotable on a pin 118a is biased by a helical spring 119 and is normally attracted by the permanent magnet core 117 of the electromagnet D so that it assumes the illustrated position in which the spring 119 stores energy. When the electromagnet D is energized in response to energization of the electromagnet A which closes the switch a, the direction of the magnetic flux in the permanent magnet core 117 changes so that the spring 119 is free to pivot the lever 118 in a clockwise direction, as viewed in FIG. 6, whereby the upper arm of the lever 118 displaces a control lever 120 forming part of a reversible drive 121. The latter can drive a takeup reel 122 in a first direction by means of a first output member 124 and a supply reel 123 in a second direction by means of a second output member 125. The output members 124, 125 are connectable with a prime mover 1121, preferably an electric motor, to rotate the respective reels 122, 123. In one of its positions, the control lever 120 causes the prime mover 1121 of the drive 121 to rotate the takeup reel 122 in a direction to collect the film F. In its other position, the control lever 120 causes the drive 121 to rapidly rotate the supply reel 123 in a direction to draw the film off the takeup reel 122. The connections between the output members 124, 125 and the prime mover 1121 preferably include one or more clutches, levers, and/or linkages. The electromagnet D can disengage with a predetermined delay a coupling (not shown) of the drive 121 to thereby terminate the rewinding operation, i.e., to disconnect the output member 125 from the prime mover 1121.

The electromagnet D, the core 117 and the lever 118 constitute a reversing means for the drive 121. Such reversing means becomes operative in response to energization of the electromagnet A which then closes the switch a. Energization of electromagnet A takes place in response to detection by the resistor 106 of the trailing or next-following film portion 103, i.e., in response to completed scanning of the preceding (main) film portion 102.

The projector can further include a shutter or mask which is moved into the space between the light source 101 and the receiver 106 when the output member 125 begins to rotate the reel 123 so that the latter draws film from the takeup reel 122. Also, the projector can include a switch (not shown) which opens the circuit of the light source in response to energization of the electromagnet D so that the light source is off during rewinding. This insures that the electromagnet D remains energized during rewinding because closing of the shutter or opening of the circuit of the light source 101 causes the receiver 106 to behave in the same way as during tracking of the trailing portion 103.

The drive 121 can be simplified by using a reversible prime mover (preferably an electric motor) which rotates the output member 124 while rotating in one direction and the output member 125 while rotating in the other direction. The reversing means D, 117, 118 then serves to change the direction of current flow in the windings of the motor.

The control circuit 104 is connectable with an energy source 126 in response to closing of a switch $b$; this switch closes in response to energization of an electromagnet B in the delay circuit 105. The electromagnet B is connected in the collector circuit of a transistor 127 whose base is connected with the collector of a further transistor 128. The base of the transistor 128 is connected with the collector of another transistor 129 in the delay circuit 105. The reference characters 130, 131, 132, 133 denote fixed resistors which form part of the delay circuit 105 and are connected with the transistors 127, 128, 129 in a manner as shown in FIG. 4. The base of the transistor 129 is connected with a time-lag unit or R-C unit including a resistor 134 and a capacitor 135. The latter can be shunted in response to closing of a switch $2f$ which can constitute a detector serving to track the film F. The switch $2f$ is mechanically connected with a switch $1f$ which can connect the energy source 126 with the delay circuit 105. The switch $1f$ is closed by the film F (see FIG. 5) when the latter is properly threaded through the projector. The main or master switch for the delay circuit 105 is shown as $h$.

Figure 5:
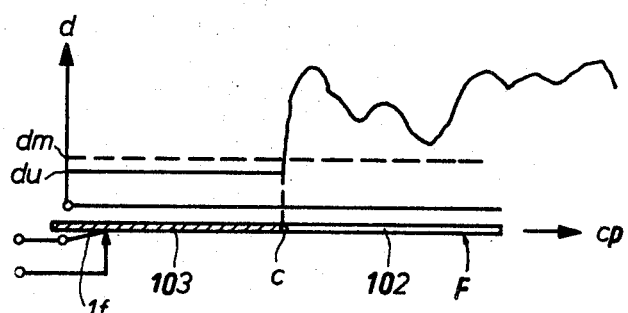
FIG. 5 is an enlarged view of a detail of FIG. 4 and further shows a diagram illustrating the light transmissivity of various portions of the film which can be used in the projector embodying the circuitry of FIG. 4.

The point where the main portion 102 of the film F ends and the trailing portion 103 begins is shown at $c$ (see FIGS. 4 and 5). FIG. 5 shows that the switch $1f$ is closed when the film F is threaded into the projector so that its leader is connected with the takeup reel 122. FIG. 5 further shows a diagram indicating that the light transmissivity $du$ of the trailing portion 103 is lower than the lowest light transmissivity of the main film portion 102. The light transmissivity $d$ is measured along the ordinate and the position $cp$ of the point $c$ is measured along the abscissa. The average light transmissivity of the main film portion 102 is shown at $dm$. The threshold value of the control circuit 104 is reached when the photoelectric resistor 106 registers with a portion of the film F whose transmissivity ($dm$) is a little higher than the light transmissivity ($du$) of the trailing portion 103.

The operation of the projector which embodies the structure shown in FIGS. 4 to 6 is as follows:

A threading mechanism (corresponding, for example, to the mechanism 7 shown in FIG. 1) extends into a properly inserted cassette (not shown) to advance the tip of the leading portion (not shown) of the film F along a predetermined path a portion of which extends between the light source 101 and the photoelectric receiver 106 of FIG. 4. The path is preferably defined by a guide roller which is located between the gate and the cassette, and a channel which guides the tip of the leading film portion toward the core of the takeup reel 122. The switches $1f$ and $2f$ are adjacent to such path and the properly threaded film F closes the switch $1f$ in a manner as shown in FIG. 5. When the operator closes the master switch $h$ (while the switch $1f$ is closed by the film F), the delay circuit 105 is connected with the energy source 126. The leading portion of the film F opens the switch $2f$ so that the capacitor 135 can be charged through the resistor 134. After elapse of an interval which is determined by the constant of the RC-unit 134, 135, the transistor 129 begins to conduct so that the transistor 128 blocks and the transistor 127 conducts. The electromagnet B is energized by the transistor 127 and closes the switch $b$ to connect the control circuit 104 with the energy source 126. This takes place at a time when the main film portion 102 is invariably in registry with the photoelectric resistor 106.

The switch 108 is closed to connect the capacitor 109 in parallel with the resistor 106 whereby the capacitor compensates for detection of eventual dark zones in the main film portion 102. When the transition point $c$ moves beyond the resistor 106 so that the latter receives light through the foremost part of the trailing portion 103, the transistor 110 begins to conduct and the transistor 114 blocks to cause the transistor 116 to conduct and to energize the electromagnet A. The electromagnet A closes the switch $a$ to energize the electromagnet D which enables the spring 119 to pivot the lever 118 in a clockwise direction and to change the position of the control lever 120. The control lever 120 then establishes a driving connection between the prime mover 1121 and the output member 125 which rotates the supply reel 123 in the inserted cassette at a high speed to rapidly rewind the film F from the takeup reel 122 onto the supply reel 123. At the same time, the control lever 120, the lever 118 or the electromagnet D opens the circuit of the light source 101. The electromagnet A remains energized until the film F moves beyond the switch $1f$ and/or $2f$. This causes a deenergization of the electromagnet B which opens the switch $b$ to deenergize the electromagnet A which opens the switch $a$ in the circuit of the electromagnet D. The latter enables the core 117 to return the lever 118 to the illustrated position whereby a spring or the like moves the control lever 120 back to the position shown in FIG. 6 and the prime mover 1121 is disconnected from the output member 125. This completes the rewinding operation. All switches return to the illustrated positions and the output member 124 is set to rotate the takeup reel 122.

It is clear that a projector which embodies the present invention can be provided with scanning means which can discriminate between the light transmissivity of the leading, trailing and main portions of motion picture film. Such scanning means can be installed in the input of a control circuit which can initiate the operations described in connection with FIGS. 1 and 2 or 1 and 3 when the leading portion of the film has advanced beyond the gate, and which can also initiate the operation or operations described in connection with FIGS. 4-6. The scanning means can comprise several discrete photoelectric receivers one of which is installed in the input of a control circuit such as the one shown in FIG. 2 or 3 and another of which is connected with the input of a control circuit corresponding to that shown in FIG. 4.

An important advantage of the improved projector is that it can substantially reduce the length of intervals between presentations of successive rolls of motion picture film. This is particularly important when a complete sequence of pictures cannot be recorded on a single roll of film so that it is desirable to complete the rewinding of a preceding film and the transport of the leading portion of the next-following film with as little delay as possible. The delays between presentations of successive rolls of motion picture film can be further reduced if the roll film is stored in cassettes, especially if the projector is designed to support and to automatically transport a stack of cassettes. The operator of the projector is then free to concentrate on the interpretation or discussion of the images of satisfactory frames on successively presented rolls of motion picture film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a cinematographic apparatus for use with motion picture film having a leading first portion, a trailing second portion and a main portion whose light transmissivity normally fluctuates and normally differs from the light transmissivity of said first and second portions, a combination comprising first and second photoelectric scanning means for scanning the film and for producing signals indicative of the light transmissivity of the scanned film portions; a plurality of adjustable units including transporting means for moving the film past said scanning means, and transporting means being arranged to move the film at a plurality of speeds and including first output means actuatable to move the film forwardly and second output means actuatable to move the film rearwardly; and means for adjusting at least one of said units in response to signals from said scanning means, including a control circuit connected with said first scanning means, means for reducing the speed of film transport by said transporting means in response to detection of said main film portion by said first scanning means following the completed scanning of said first film portion, said speed reducing means including first electromagnet means connected with said control circuit and having its condition of energization changed in response to detection of said main film portion by said first scanning means whereby said change in the condition of said first electromagnet means initiates said reduction in the speed of film transport by said transporting means, second electromagnet means for deactivating said first output means and for activating said second output means in response to detection of said second film portion by said second scanning means subsequent to completed scanning of said main film portion, and means for preventing a deactivation of said first output means in response to fluctuations in the light transmissivity of said main film portion, means for preventing a deactivation of said first output means in response to fluctuations in the light transmissivity of said main film portion, and means for preventing the activation of said second output means during transport of said first film portion past said second scanning means.

2. A combination as defined in claim 1, wherein said first scanning means comprises photoelectric receiver means and said control circuit having an input portion connected with said receiver means and an output portion, connected with said first electromagnet means.

3. A combination as defined in claim 1, further comprising a cassette containing a supply of convoluted motion picture film, said transporting means being arranged to advance the leading and second portions and thereupon the main portion of the film in the cassette past scanning means.

4. A combination as defined in claim 1, wherein said transporting means is arranged to transport the film along a predetermined path and said first scanning means comprises a photoelectric receiver adjacent to one side of said path and a light source located at the other side of said path and arranged to direct a beam of light through the film in said path and against said receiver.

5. A combination as defined in claim 4, wherein said light source is the projector lamp of said apparatus.

6. A combination as defined in claim 5, further comprising a gate adjacent to said other side of said path and having a window for passage of light from said source through the lens system of the apparatus and an aperture located upstream of said window, as considered in the direction of film transport along said path while the film is being drawn from a source of supply, said aperture being positioned to transmit said beam of light against the film in said path and being located opposite said receiver.

7. A combination as defined in claim 1, further comprising a supply reel for motion picture film, said transporting means further including means for rotating said supply reel and said adjusting means being arranged to disengage said transporting means from said supply reel in response to detection by said first scanning means of said means film portion.

8. A combination as defined in claim 7, wherein said film transporting means is arranged to rotate the supply reel in a direction to pay out the film.

9. A combination as defined in claim 1, further comprising a supply reel for convoluted motion picture film and a takeup reel, said transporting means being arranged to advance the film between said reels along a predetermined path extending along said scanning means and said first electromagnet means being arranged to reduce the speed of said takeup reel in response to detection by said first scanning means of said main film portion.

10. A combination as defined in claim 1, wherein said transporting means is arranged to advance the film along a predetermined path and another of said unit a includes pressure plate means movable with reference to said path by said adjusting means.

11. A combination as defined in claim 10 wherein said pressure plate means is movable by said adjusting means toward said path.

12. A combination as defined in claim 1, wherein the film is provided with at least one row of perforations and another of said units comprises pull-down means having claw means movable by said adjusting means into engagement with the perforations of film in response to detection by said first scanning means of said main film portion.

13. A combination as defined in claim 1, further comprising a light source and a lens system through which the light from said source passes during the projection of images of frames on the film, another of said units comprising masking means movable between two positions in one of which it obstructs the passage of light to said lens system and in the other of which it permits light to pass from said source to said lens system, said adjusting means being arranged to move said masking means from one of said positions to the other position in response to detection by said first scanning means of said main film portion.

14. A combination as defined in claim 1, wherein said control circuit includes a switching stage having a plurality of transistors.

15. A combination as defined in claim 1 wherein said control circuit includes thyristor means.

16. A combination as defined in claim 1, wherein said transporting means includes a reversible drive including said first and said second output means, said drive further including a prime mover and control means normally coupling said prime mover with said first output means and arranged to disconnect the prime mover from said first output means to thus deactivate said first output means and to simultaneously connect the prime mover with said second output means under the action of said second electromagnet means when said second scanning means begins to scan said second film portion.

17. A combination as defined in claim 16, wherein said second scanning means comprises photoelectric receiver means adjacent to the path of the film and said adjusting means further comprises a second control circuit having an input connected with said receiver means and an output operatively connected with said second electromagnet means.

18. A combination as defined in claim 17, wherein said second control circuit is a transistorized circuit.

19. A combination as defined in claim 18, wherein said second control circuit comprises third electromagnet means energizable in response to detection of said second portion of film by said second scanning means and switch means which is closed in response to energization of said third electromagnet means to thereby energize said second electromagnet means.

20. A combination as defined in claim 16, wherein said drive further comprises coupling means and said control means is arranged to engage said coupling means in response to reception of motion from said second electromagnet means.

21. A combination as defined in claim 16, wherein said reversible drive further comprises normally engaging coupling means which is disengaged by said second electromagnet means with a delay following deactivation of said second output means to thereby terminate the rewinding of film.

22. A combination as defined in claim 1, wherein said second scanning means comprises a photoelectric receiver and said adjusting means further comprises a second control circuit including capacitor means and means for connecting said capacitor means in parallel with said receiver, said capacitor means constituting said preventing means.

23. A combination as defined in claim 1, wherein said second means comprises photoelectric receiver means and said adjusting means further comprises a second control circuit having an input connected with said receiver means and a switching stage including a plurality of transistors.

24. A combination as defined in claim 1, wherein said second scanning means comprises photoelectric receiver means and said adjusting means further comprises a second control circuit having an input connected with said receiver means, a source of electrical energy, and an electric delay circuit having switch means for connecting said second control circuit to said energy source with a predetermined delay following detection of said second film portion by said receiver means.

25. A combination as defined in claim 24, wherein said delay circuit further comprises an output including third electromagnet means energizable to actuate said switch means, a switching unit for energizing said third electromagnet means, and an input including an RC-unit connected with said switching unit, said R-C unit including resistor means and capacitor means connected in series with said resistor means.

26. A combination as defined in claim 25, further comprising second switch means actuatable by the film to connect said delay circuit with said energy source.

27. A combination as defined in claim 25, further comprising third switch means for shunting said capacitor means in response to removal of film from the apparatus.

28. A combination as defined in claim 16, wherein said second scanning means comprises at least one photoelectric receiver and a light source for directing a beam of light across the film path against said receiver, and further comprising means for intercepting said light beam in response to reversal of operation of said drive.

29. A combination as defined in claim 16, further comprising a light source and means for turning off said light source in response to reversal of operation of said drive.

* * * * *